United States Patent [19]
Abernathy

[11] Patent Number: 5,397,585
[45] Date of Patent: Mar. 14, 1995

[54] METHOD FOR REDUCING THE FAT CONTENT IN A COOKED GROUND MEAT PATTY

[76] Inventor: Frank W. Abernathy, 1518 River Bend Rd., Columbus, Ohio 43223

[21] Appl. No.: 254,639

[22] Filed: Jun. 8, 1994

Related U.S. Application Data

[63] Continuation-in-part of Ser. No. 991,869, Dec. 16, 1992, abandoned.

[51] Int. Cl.$^6$ .............................................. A23L 1/317
[52] U.S. Cl. ..................................... 426/417; 426/478
[58] Field of Search ............... 426/417, 478, 513, 518; 100/37, 39, 116, 910

[56] References Cited

U.S. PATENT DOCUMENTS

| | | | |
|---|---|---|---|
| 2,037,892 | 4/1936 | Gleason | 426/478 |
| 2,670,296 | 2/1954 | Tansley | 426/513 |
| 3,098,747 | 7/1963 | Dubil | 426/478 X |
| 4,514,434 | 4/1985 | Goldberger et al. | 426/513 X |
| 4,948,607 | 8/1990 | Margolis | 426/417 X |
| 5,008,122 | 4/1991 | Rosnack et al. | 426/417 |
| 5,082,678 | 1/1992 | Margolis | 426/417 X |

Primary Examiner—Arthur L. Corbin
Attorney, Agent, or Firm—Mueller and Smith

[57] ABSTRACT

A method for reducing the fat content in a cooked ground meat patty. The patty is immersed in a potable, substantially non-fat immersion liquid which is maintained at a temperature effective to liquefy at least a portion of the fat contained therein. Pressure is applied to the immersed patty sufficient to exude at least a portion of the liquefied fat into the immersion liquid for its removal from the patty. The pressure on the immersed patty then is relieved to absorb thereinto a portion of the immersion liquid for replacing at least a portion of the fat removed.

14 Claims, 1 Drawing Sheet

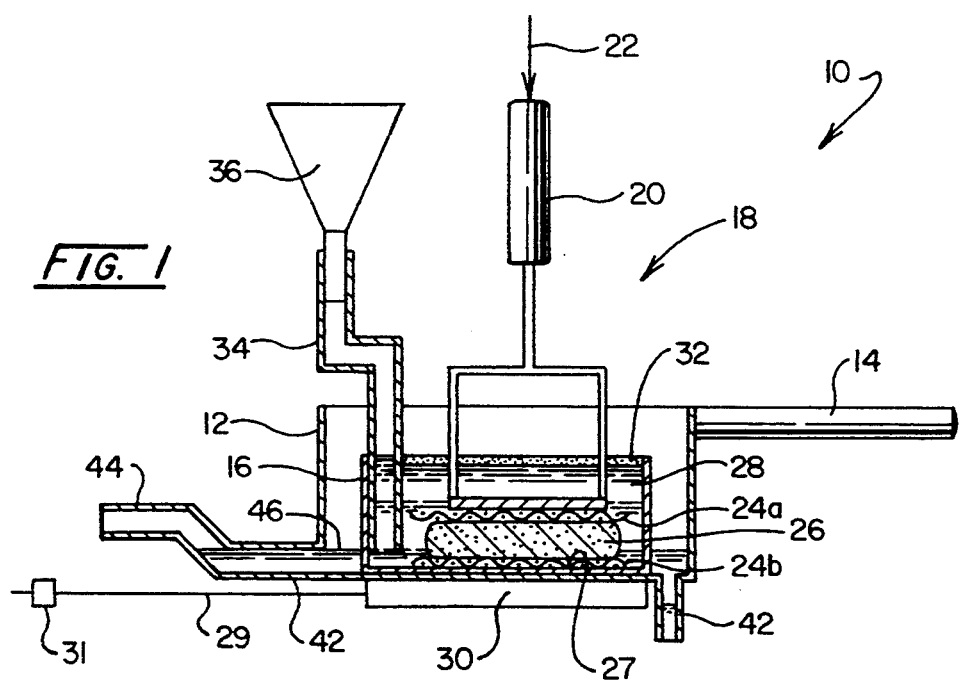
FIG. 1
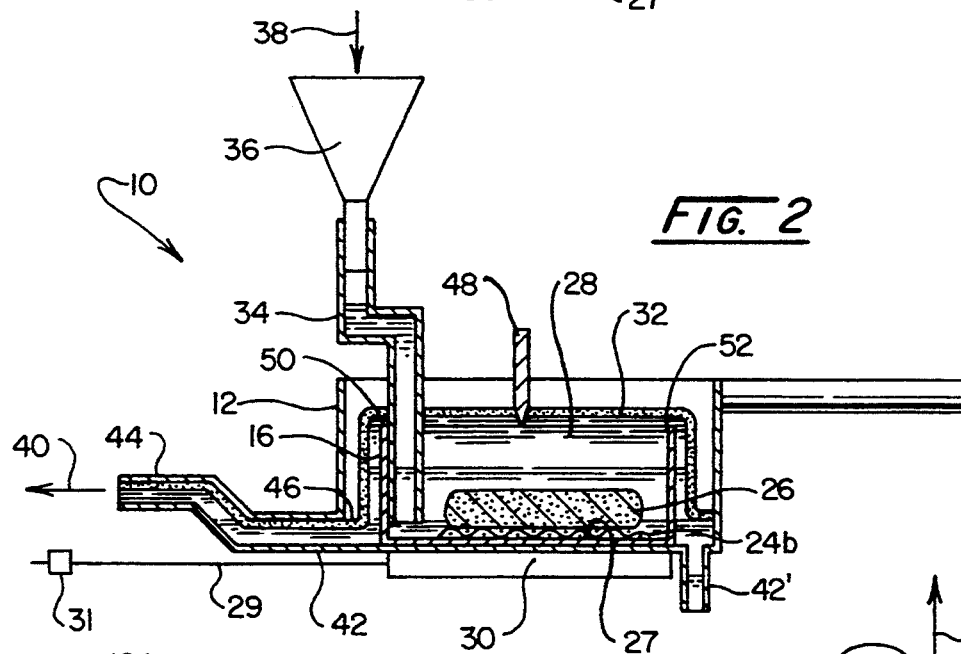
FIG. 2
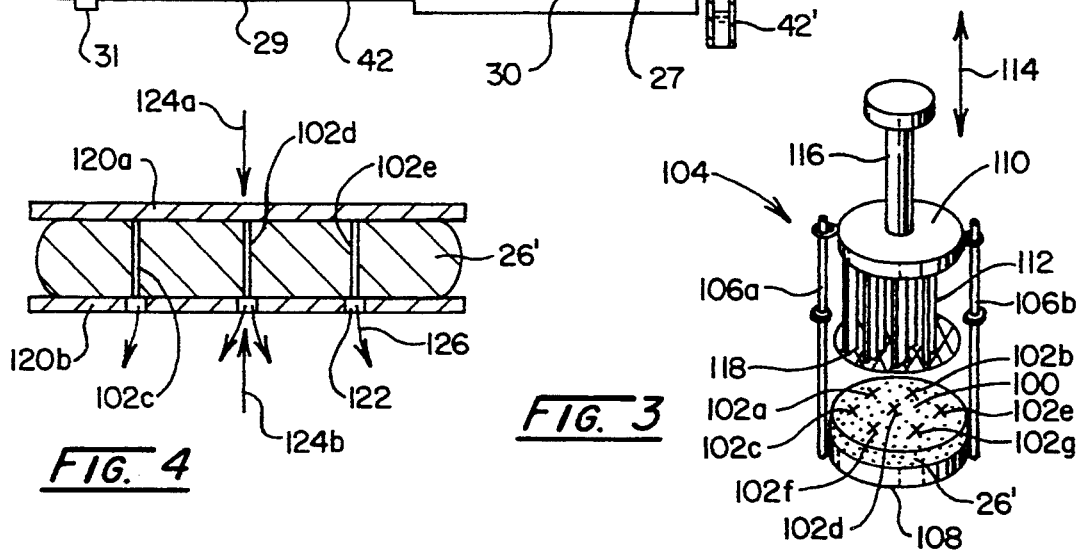
FIG. 4
FIG. 3

METHOD FOR REDUCING THE FAT CONTENT IN A COOKED GROUND MEAT PATTY

CROSS-REFERENCE TO RELATED APPLICATIONS

This application is a continuation-in-part of application USSN 07/991,869, filed Dec. 16, 1992, now abandoned.

BACKGROUND OF THE INVENTION

The present invention is addressed to a method for reducing the fat content in a cooked ground meat patty or the like which keeps the patty hot and juicy, and is effective in killing bacteria and other microorganisms which might contaminate the patty and make it unfit for human consumption.

It has been recommended by many medical groups and the like that people restrict their intake of dietary fat, and especially of saturated fats, as a means of reducing their overall levels of serum cholesterol and, concomitantly, of their risk of heat disease. To reduce the consumption of dietary fat, it has been suggested that people substitute red meat products, which have been demonstrated to have a high percentage of saturated fats, with poultry or fish products which are relatively lower in saturated fats. However, either out of habit or a taste preference for red meat, many segments of the population have been slow to change their eating habits as suggested.

Indeed, notwithstanding the identified risks of a high fat diet, the so-called "fast food" hamburger chains have remained popular. These chains are known to offer convenience foods such hamburgers and the like which are both tasty and inexpensive, but which also contain a relatively high percentage of fat. As it would be unrealistic to assume that a majority of the population will cease to frequent these chains, a better solution would be for these restaurants to offer their customers palatable, low-fat alternatives to the standard high-fat fare. Such alternatives also would be appreciated by any "backyard" chef who wishes to offer his or her family meals which are both tasty and healthy.

In this regard, proposal have been made for methods of removing fat from ground meat products such as hamburgers. For example, Margolis, U.S. Pat. Nos. 4,948,607 and 5,082,678, describe methods for removing fat from a ground meat patty such as a hamburger which entail the steps of cooking the patty to within a temperature which is sufficiently hot to liquefy the fat in the patty, and then applying pressure to the meat to force a portion of the liquefied fat from the patty. As a third step, a liquid flavoring solution may be injected into the pressed patty to purportedly achieve the flavor and juiciness of an untreated meat product.

Although methods such as those described in the Margolis citations would have been expected to be widely accepted, the fact remains that majority of people have failed to embrace any of the low-fat hamburgers or alternatives which heretofore have been offered, and have continued to dine on the high-fat varieties. Such failures might be explained by the vagaries of the palates of the consuming public, or to problems in the commercial implementation of the previous methods. In any event, it will be appreciated that a method for removing fat from ground meat products such as hamburgers and the like which preserves the flavor, juiciness, and texture of the meat would be widely accepted by those who enjoy such products.

BROAD STATEMENT OF THE INVENTION

The present invention is directed to a method for reducing the fat content in a cooked ground meat patty, such as a beef, pork, veal, lamb, chicken, or turkey patty or the like. In providing for the immersion of the patty in a heat transfer medium such as heated water or the like during the removal of the fat therefrom, the method of the invention keeps the patty both hot and juicy, and is effective in killing bacteria and other microorganisms which might otherwise contaminate the patty.

It therefore is a feature of the present invention to provide a method for reducing the fat content in a cooked ground meat patty. The patty is immersed in a potable, substantially non-fat immersion liquid which is maintained at a temperature effective to liquefy at least a portion of the fat contained therein. Pressure is applied to the immersed patty sufficient to exude at least a portion of the liquefied fat into the immersion liquid for its removal from the patty. The pressure on the immersed patty then is relieved to absorb thereinto a portion of the immersion liquid for replacing at least a portion of the fat removed.

It is a further feature of the invention to provide a method for reducing the fat content in a cooked ground meat patty which involves the steps of: forming at least one opening through the outer surface of the cooked ground meat patty; maintaining the cooked ground meat patty at a temperature sufficient to liquefy at least a portion of the fat contained therein; compressing the cooked ground meat patty to exude at least a portion of the liquefied fat therein through the opening; and removing the exuded fat from the cooked ground meat patty.

The invention, accordingly, comprises the method possessing the arrangement of steps which are exemplified in the following detailed description. Reference to that description and to the accompanying drawings should be had for a fuller understanding and appreciation of the nature and objects of the invention, although other objects may be obvious to those skilled in the art.

BRIEF DESCRIPTION OF THE DRAWINGS

For a fuller understanding of the nature and objects of the invention, reference should be had to the following detailed description taken in connection with the accompanying drawings wherein:

FIG. 1 shows a cross-sectional view of a representative fat removal apparatus as involved in the step according to the present invention of compressing a cooked ground meat patty immersed in a heated immersion liquid with a force sufficient to exude at least a portion of the liquefied fat in the patty into the immersion liquid for its removal from the patty;

FIG. 2 shows the apparatus of FIG. 1 as involved in the steps according to the present invention of relieving the pressure on the immersed cooked ground meat patty of FIG. 1 to absorb thereinto a portion of the immersion liquid for replacing at least a portion of the fat removed, and of adding additional potable liquid to the immersion liquid to flush the exuded fat away from the cooked ground meat patty;

FIG. 3 is a perspective view of an apparatus for forming openings through the outer surface of a cooked ground meat patty in accordance with the method of the present invention; and FIG. 4 is a cross-sectional view showing, according to the present invention, the compression of the cooked ground meat patty of FIG. 4 between a pair of heated, perforated plates for exuding at least a portion of the liquefied fat through the openings formed in the patty.

The drawings will be described further in connection with the following Detailed Description of the Invention.

DETAILED DESCRIPTION OF THE INVENTION

The precepts of the method of the invention herein involved for reducing the fat content in a cooked ground meat patty are described hereinafter in connection with a ground beef or hamburger patty which typically contains about 17% fat by weight. However, it will be appreciated that the method will find utility in reducing the fat content in other ground meat or poultry patties such as beef, pork, veal, lamb, chicken, turkey, and mixtures thereof, which patties may include vegetable or other fillers such as made from soybeans or the like. Thus, the disclosure to follow should be construed as illustrative rather than in a limiting sense.

Broadly, one aspect of the method of the invention herein involved for reducing the fat content in a cooked ground meat patty such as a hamburger entails the steps of: (a) immersing the cooked ground meat patty in a potable, substantially non-fat immersion liquid maintained at a temperature effective to liquefy at least a portion of the fat contained in the cooked ground meat patty; (b) applying a pressure to the immersed cooked ground meat patty sufficient to exude at least a portion of the liquefied fat into the immersion liquid for its removal from the cooked ground meat patty; and (c) relieving the pressure on the immersed cooked ground meat patty to absorb thereinto a portion of the immersion liquid for replacing at least a portion of the fat removed. In providing for the immersion and compression of the cooked patty in a heat transfer liquid such as water or the like, the subject method advantageously effects the absorption of a portion of the immersion liquid into the patty upon the relieving of pressure applied thereto. The absorbed liquid replaces at least a portion of the fat which was removed during the compression of the patty, and thereby keeps the patty moist and juicy. Moreover, the adsorbed liquid, having been heated to a temperature for liquefying a potion of the fat in the patty, additionally transfers heat into the patty. The transferred heat is effective both in keeping the patty warm, and in killing bacteria or other microorganisms which might otherwise contaminate the patty. Although it has been suggested to inject a flavoring solution into a patty after it is pressed, it will be appreciated that in using an immersion liquid both to remove fat from the patty, and to keep the patty hot, moist, and flavorful, the subject method is able to effect in a single step what heretofore has required a succession of steps to achieve. Thus, the method of the invention is both economical and fast, and therefore is seen as being especially attractive both for commercial as well as for in-home use.

Referring now to the figures, a representative fat removal apparatus for effecting the precepts of the present invention is shown in FIG. 1 generally at 10. Fat removal apparatus 10 is seen to comprise an outer chamber, 12, which may be provided as a pot or the like having a handle, 14. Within outer chamber 12 is disposed an inner chamber, 16, within which, in turn, is disposed a press assembly, shown generally at 18. Press assembly 18 comprises a pressure member, 20, which, as is shown at 22, is hand-actuable to provided a generally downward force or pressure on a pair of plates, 24a and 24b, which preferably are formed of a wire mesh screen or grating for admitting fluid flow therethrough. For convenience, plate 24a may be attached to pressure member 20 as shown.

Between plates 24 is disposed a cooked ground meat patty, 26, which, for the purposes of this illustration, is provided as a fully-cooked ground beef or hamburger patty having a fat content of about 17% by weight. Plate 24b is optional, however, and may be removed for the disposition of patty 26 directly on the lower surface 27 of inner chamber 16. However disposed, patty 26 is immersed in inner chamber 16 in a potable, substantially non-fat immersion liquid, 28, which preferably is water or the like. Immersion liquid 28 is maintained at a temperature of about 100° C. by means of, for example, a radiant or conductive heating element, 30, disposed in a heat transfer relationship with inner chamber 16 and having associated electrical leads, 29, and socket, 31, for attachment to an AC or DC power source (not shown). The temperature at which immersion liquid 28 is maintained has been observed to be effective to liquefy at least a portion of the fat contained in ground meat patty 26.

In operation, the generally downward force or pressure applied at 22 to pressure member 20 effects a general compression of patty 26 between plates 24. Such compression is effective to exude at least a portion of the liquefied fat, now represented at 32, into immersion liquid 28 for its removal from patty 26. In addition to animal fat, fat 32 also may include such soluble contaminates as hormones, antibiotics, and procarcinogens. Upon the relieving of the pressure 22 imposed upon patty 26, and as may be appreciated best through additional reference to FIG. 2, additional immersion liquid 28 may be introduced into inner chamber 16 for the purpose of flushing the exuded fat 32 away from patty 26. In this regard, an inlet tube, 34, having a funnel portion, 36, is provided for receiving the additional immersion liquid 28 as is shown at 38. The fat 32 is flushed from patty 26, out of inner chamber 16, and into outer chamber 12, whereupon it may be removed from apparatus 10, as is shown at 40, via an outlet tube, 42, which may lead to a drain or a collection vessel (not shown). Outlet tube 42 may be formed as having a trap portion, 44, configured to maintain a predetermined level, shown at 46, of liquid 28 within outer chamber 12. Such level 46 advantageously provides a heat sink having a high thermal mass which assists in maintaining a generally isothermal temperature distribution within inner chamber 16. Alternatively, outlet tube 42 may be provided as the drain configuration shown at 42'.

As an alternative or in addition to the flushing of the exuded fat 32 from patty 26, a sweeper assembly, 48, may be provided. Sweeper assembly 48 is shown to be hand-actuable between a forward position, 50, and a rearward position, 52, for "squeegeeing" the exuded fat 32 on the surface of immersion liquid 28 from inner chamber 16 and into outer chamber 12. As before, the fat 32 may be removed from outer chamber 12 via outlet tube 42.

As also may be appreciated best through reference to FIG. 2, the relieving of pressure 22 (FIG. 1) on the immersed patty 26 effects the absorption of at least a portion of the immersion liquid 28 into patty 26, which absorption replaces at least a portion of the fat 32 removed therefrom. As aforementioned, the absorption of immersion liquid 28 into patty 26 enhances the flavor thereof by keeping it hot and juicy. Moreover, an additive such as a seasoning or a flavor concentrate may be provided in immersion liquid 28 for the purpose of further enhancing the flavor of patty 26 when absorbed thereinto with liquid 28. Moreover, the absorption of heated immersion liquid 28 into patty 26 effects a heat transfer therebetween which will be appreciated to be effective in killing bacteria or other microorganisms which might otherwise contaminate patty 26.

It has been observed that the method of the invention as described herein in connection with FIGS. 1 and 2 is effective in reducing the fat content in a cooked beef or hamburger patty by at least about 50%, i.e., from about 17% to less than about 9%. Advantageously, such method may be adapted to home or commercial applications. For example, multiple patties 26 may be processed for home or commercial use via the enlargement of the internal extent of inner chamber 16, or the provision of multiple inner chambers 16 having a common heating element 30. For commercial applications in a restaurant setting or like, a continuous processing methodology may be envisioned wherein a conveyer system or the like is provided for transporting a succession of patties 26 to a punch-press or a roller assembly for their compression. Given its adaptability to a variety of home and commercial applications, the method of the present invention is seen as having a broad appeal.

Referring next to FIG. 3, an additional aspect of the inventive method is illustrated wherein cooked ground meat patty 26 is shown as cooked patty 26' having an outer surface, 100, through which has been formed at least one and, preferably, a number of openings as is shown at 102a–g. For forming openings 102 through the outer surface 100 of patty 26', a perforation assembly, as is shown generally at 104, may be employed. Perforation assembly 104 is provided as having a pair of upstanding frame members, 106a and 106b, extending from a lower base portion, 108. An upper perforation member, 110, having a number of downwardly extending skewers, one of which is shown at 112, is provided to be slidably movable along frame members 106 as is shown at 114. As perforation member 110 is moved towards patty 26', skewers 112 penetrate the outer surface 100 of patty 26' for forming openings 102 thereinto. A handle, 116, is provided for the hand-actuable movement of perforation member 110 to patty 26'. A deskewering ting, 118, additionally may be provided intermediate perforation member 110 and base portion 108 for removing the skewered patty 26' from skewers 112 upon the return stroke of perforation member 110.

In accordance with the precepts of the present invention, patty 26' may be substituted for patty 26 in the method which has been illustrated hereinbefore in connection with FIGS. 1 and 2. In this regard, the provision of openings 102 through the outer surface 100 of patty 26' forms a plurality of channels through which additional fat may be exuded from the patty. Moreover, as openings 102 are provided into patty 26' after it is cooked or grilled, such openings are not cauterized or otherwise sealed as would be expected if formed into a raw or uncooked patty.

As an alternative to removing the exuded fat from patty 26' via its immersion in immersion liquid 28 (FIGS. 1 and 2), an alternative methodology may be employed as is shown schematically in FIG. 4. In this regard, a pair of platens, an upper platen 120a and a lower platen 120b, are provided, the lower platen 120b having a plurality of perforations, one of which is shown at 122, formed therethrough. Patty 26' is interposed between perforated platens 120a and 120b, whereupon, as is illustrated by arrows 124a and 124b, a generally compressive force may be applied to patty 26' sufficient to exude at least a portion of the liquefied fat therein through openings 102. Platens 124 may be heated radiantly or conductively such that patty 26' is maintained at a temperature sufficient to liquefy at least a portion of the fat contained therein. As is shown, for example, at 126, the fat exuded from patty 26' may be removed therefrom via its passage through perforations 122 of platen 120b. Such methodology also has been observed to reduce the fat content in a cooked meat patty such as a hamburger or the like by at least about 50% by weight.

As it is anticipated that certain changes may be made in the present invention without departing from the precepts herein involved, it is intended that all matter contained in the foregoing description shall be interpreted as illustrative and not in a limiting sense.

What is claimed:

1. A method for reducing the fat content in a cooked ground meat patty comprising the steps of:
    (a) immersing said cooked ground meat patty in a potable, substantially nonfat immersion liquid maintained at a temperature effective to liquefy at least a portion of the fat contained in said cooked ground meat patty;
    (b) applying a pressure to the immersed cooked ground meat patty sufficient to exude at least a portion of the liquefied fat into the immersion liquid for its removal from said cooked ground meat patty; and
    (c) relieving the pressure on the immersed cooked ground meat patty to absorb thereinto a portion of said immersion liquid for replacing at least a portion of the fat removed.

2. The method of claim 1 wherein the fat content in said cooked ground meat patty is reduced by at least about 50%.

3. The method of claim 1 wherein said immersion liquid contains an additive selected to enhance the flavor of said cooked ground meat patty when absorbed thereinto.

4. The method of claim 1 wherein said immersion liquid comprises water maintained at a temperature of about 100° C.

5. The method of claim 1 further comprising the step of forming at least one opening through the outer surface of said cooked ground meat patty prior to its immersion in said immersion liquid, at least a portion of said liquefied fat being exuded through said opening.

6. The method of claim 1 further comprising the step of adding additional potable liquid to said immersion liquid to flush the exuded fat away from said cooked ground meat patty.

7. The method of claim 1 wherein said cooked meat patty contains about 17% fat by weight before its immersion in said immersion liquid.

8. The method of claim 1 wherein said cooked ground meat patty comprises a meat selected from the group consisting of beef, pork, veal, lamb, chicken, turkey, and mixtures thereof.

9. The method of claim 8 wherein said cooked ground meat patty further comprises a vegetable filler.

10. A method for reducing the fat content in a cooked ground meat patty comprising the steps of:
  (a) forming at least one opening through the outer surface of said cooked ground meat patty;
  (b) maintaining said cooked ground meat patty at a temperature sufficient to liquefy at least a portion of the fat contained therein;
  (c) compressing said cooked ground meat patty to exude at least a portion of the liquefied fat therein through said opening; and
  (d) removing the exuded fat from said cooked ground meat patty.

11. The method of claim 10 wherein said cooked ground meat patty contains about 17% fat by weight before its compression.

12. The method of claim 10 wherein the fat content in said cooked ground meat patty is reduced by at least about 50%.

13. The method of claim 10 wherein said cooked ground meat patty comprises a meat selected from the group consisting of beef, pork, veal, lamb, chicken, turkey, and mixtures thereof.

14. The method of claim 13 wherein said cooked ground meat patty further comprises a vegetable filler.

* * * * *